March 9, 1965
P. R. JOHNSON ET AL
3,172,544
SLACK PULLER
Filed Dec. 31, 1962
4 Sheets-Sheet 1
FIG.___1A
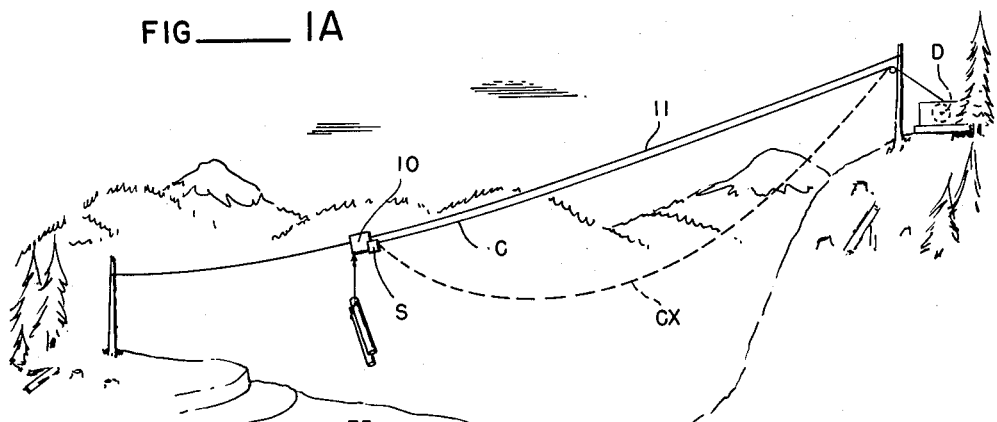
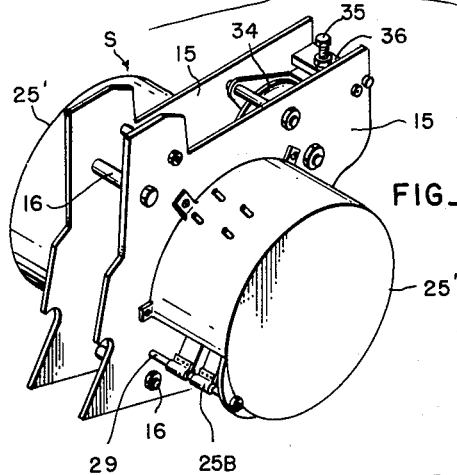
FIG.___1
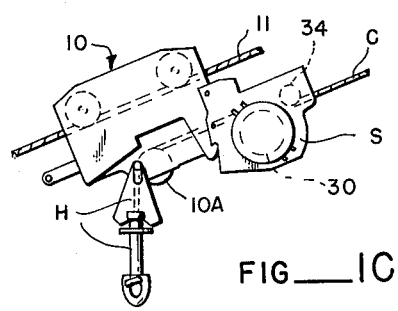
FIG.___1C
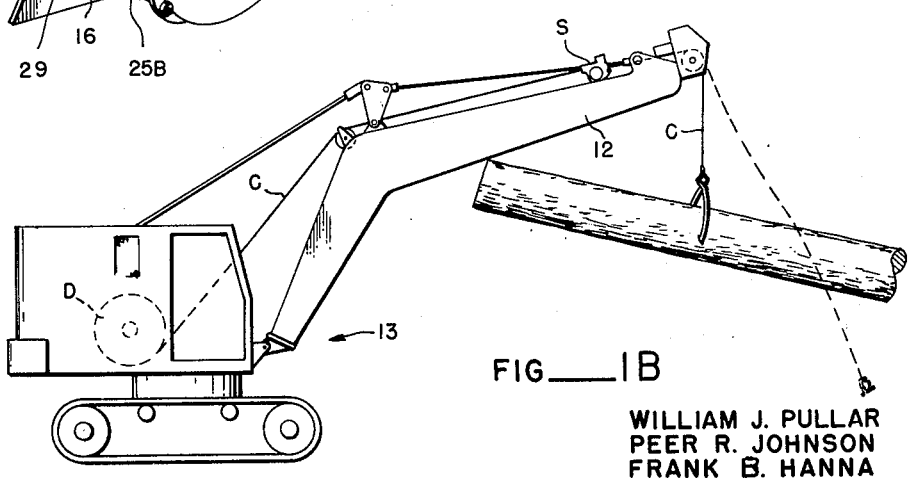
FIG.___1B
WILLIAM J. PULLAR
PEER R. JOHNSON
FRANK B. HANNA
INVENTORS
BY *Seed & Berry*
ATTORNEYS

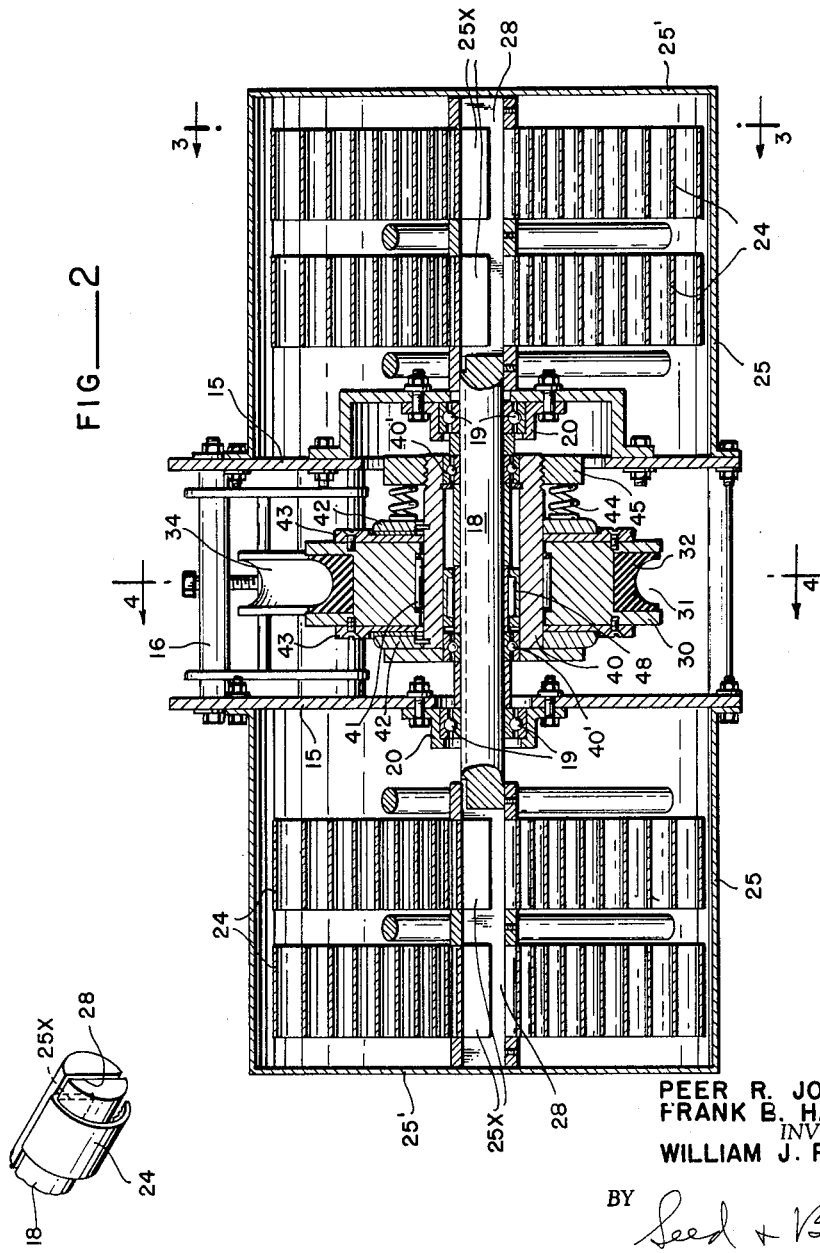

March 9, 1965
P. R. JOHNSON ET AL
3,172,544
SLACK PULLER
Filed Dec. 31, 1962
4 Sheets-Sheet 3
FIG__3
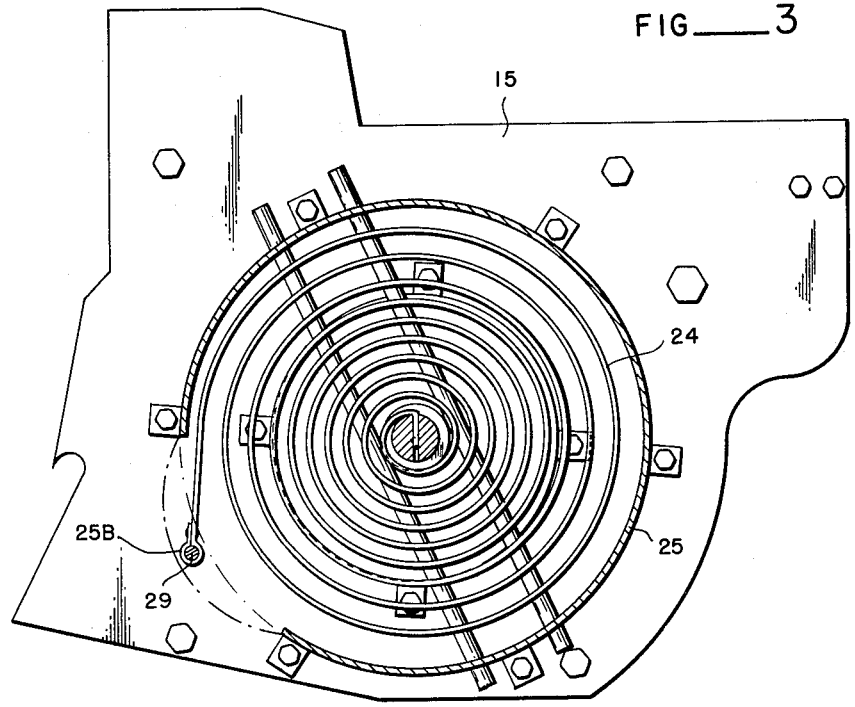
FIG__4
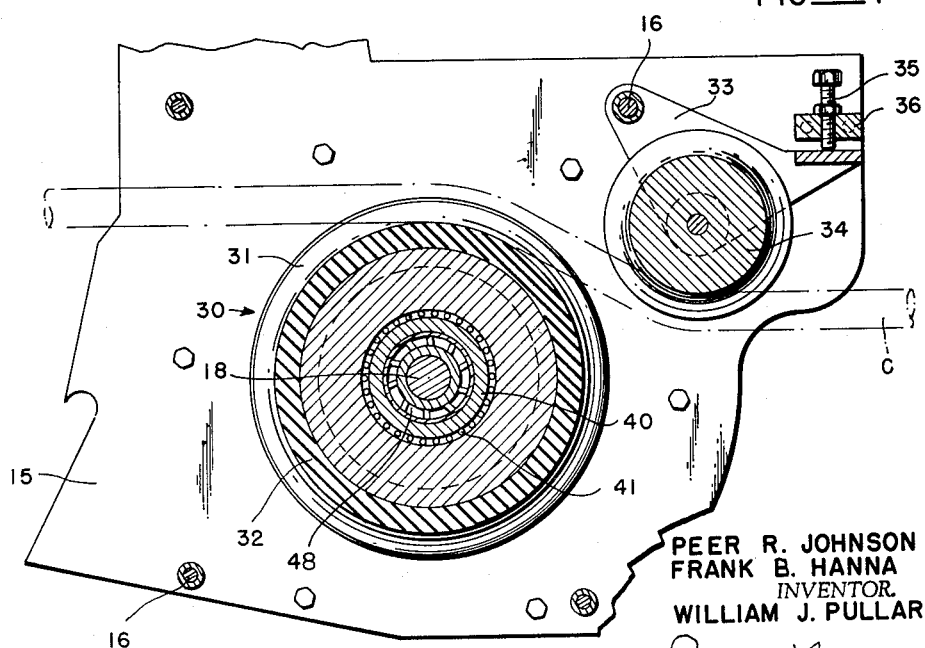
PEER R. JOHNSON
FRANK B. HANNA
WILLIAM J. PULLAR
INVENTOR.
BY *Seed & Berry*
ATTORNEYS March 9, 1965  P. R. JOHNSON ET AL  3,172,544
SLACK PULLER
Filed Dec. 31, 1962  4 Sheets-Sheet 4
FIG__5
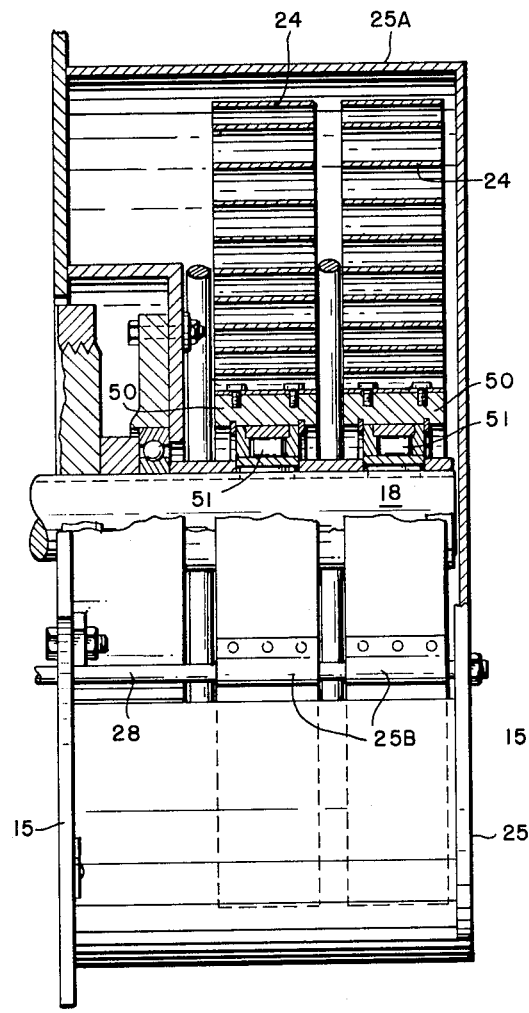
FIG__6
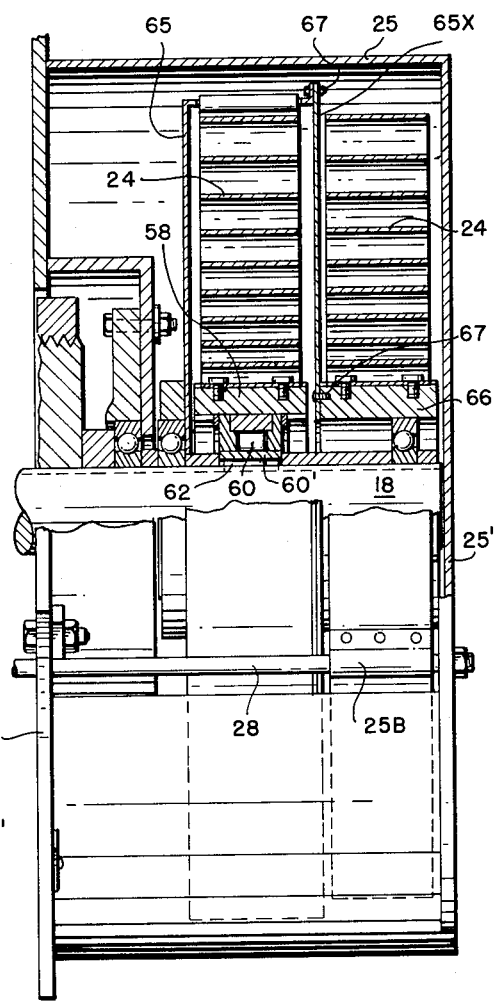
WILLIAM J. PULLAR
PEER R. JOHNSON
FRANK B. HANNA
INVENTOR.
BY Seed + Berry
ATTORNEYS

United States Patent Office 3,172,544
Patented Mar. 9, 1965

3,172,544
SLACK PULLER
Peer Richard Johnson, 2536 S. Park Drive; Frank B. Hanna, 2926 Cedarwood; and William J. Pullar, 3114 30th St., all of Bellingham, Wash.
Filed Dec. 31, 1962, Ser. No. 248,567
7 Claims. (Cl. 212—89)

This invention relates to mechanisms which, in that particular art to which they belong, have been designated as "Slack Pullers." More particularly, it relates to Slack Pullers that are especially applicable for use in association with load lifting and conveying apparatus such as that of U.S. Patent No. 2,790,561 to J. Wyssen, and other devices employed in the logging industry for log or load yarding and loading.

It is the principal object of the present invention to provide an improved slack pulling mechanism designed for use in logging operations as for example, as applied to a sky-line carriage, for the drawing out of the slack in the load lifting cable between its winding drum and the carriage to effect a downdrop of the butt-hook for making its connection with a turn of logs that is to be picked up and conveyed.

It is also an object of the present invention to provide the power for the slack pulling operation by the utilization of expanding forces of one or more spirally wound springs, incorporated within the slack puller.

Furthermore, it is an object of the present invention to provide means in the device that operates, incident to the winding in of the load lifting line on its power driven drum, to wind the springs for the storage therein of the power required for the slack pulling operation.

Another object is to provide slack pullers in accordance with the present invention that may be modified readily for their application to and use with such load handling machines as present day heel boom log loaders, and various other mechanisms of a similar character.

Yet another object of this invention is to provide a modified form of slack puller that is powered by a plurality of spirally wound springs and which is characterized by means that joins the springs in series for a longer dispensing of slack pulling power of reduced value as differentiated from the simultaneous dispensing of the full power from all springs for faster, high speed operation.

Further objects of this invention reside in the details of construction and combination of parts embodied in the present slack pulling mechanism and in its manner of application mode of operation and use, as hereinafter described.

In accomplishing these above mentioned and other objects of the invention, we have provided the improved details of construction, the preferred forms of which are illustrated in the accompanying drawings, wherein:

FIG. 1 is a perspective view of a slack pulling mechanism embodied by this invention, shown apart from any associated structure, or device with which it may be used.

FIG. 1A is a view illustrating the application of the slack puller of FIG. 1, to a certain type of sky-line carriage for use in a down hill logging operation.

FIG. 1B is a view illustrating an application of a slack puller of this invention, to the heeling boom of a present day type of log loader.

FIG. 1C is a schematic illustration of the present slack puller as applied to a certain present day sky-line carriage.

FIG. 2 is a longitudinal, vertical sectional view taken axially of the spring powered slack pulling mechanism of this invention.

FIG. 3 is a transverse, vertical section, taken on line 3—3 in FIG. 2, showing the manner of mounting one of the powering springs.

FIG. 4 is a transverse vertical section taken on line 4—4 in FIG. 2, showing the cable driven spring winding sheave.

FIG. 5 is a sectional detail showing an alternative manner of mounting the slack pulling springs and illustrating the one-way clutching means as employed between the powering springs and spring winding shaft.

FIG. 6 is a similar sectional detail, showing another alternative form of spring mounting and spring connecting means that provides for the dispensing of slack pulling power successively from the springs.

FIG. 7 is a perspective view of an end portion of the spring driven shaft shown in FIGS. 2, 3, and 4.

Referring more in detail to the drawings:

In FIGS. 1A and 1B, respectively, we have illustrated the present slack puller of FIG. 1 as applied in use to load or log handling mechanisms of two well known but different types; the slack pullers illustrated in these views being substantially the same and each being designated in its entirety by reference character S.

As seen in FIG. 1A the slack puller S is fixedly mounted on a carriage 10 that is equipped for travel in the usual way on a sky-line cable 11. In FIG. 1B, the slack puller S is shown to be functionally mounted on the heeling boom 12 of a typical shovel type log loader 13. In each of these views the lifting line or cable used in connection with the slack puller for load lifting is designated by reference letter C and it is to be understood that this cable, in each instance, is adapted to be wound onto and from a power driven cable winding drum, such as that designated by reference character D. The desirability for and use of the slack puller in each of these operations will be explained after describing its construction as shown best in FIGS. 2, 3, and 4.

In that form of construction, seen best in FIGS. 1 and 2 the slack puller S is seen to comprise a rigid frame structure made up of two vertical parallel and laterally spaced metal plates 15—15, which are joined rigidly in a predetermined spaced relationship by tie bolts and spacer assemblies 16 that are applied thereto adjacent their top and bottom edges. These frame plates 15—15 are shaped for convenient and ready fixed attachment to supporting parts of the carriage, boom or other mechanism with which the slack puller is to be used, and they may be varied in size and shape to best suit the particular device to which the mechanism is applied. Extended horizontally through the frame plates 15—15 at a medial location as best seen in FIG. 2, is a spring winding shaft 18 that is rotatably mounted in anti-friction bearings 19—19 which, in turn, are mounted in housings 20—20 fixed to the plates 15—15.

It is to be noted that the opposite end portions of the spring winding shaft 18 extend through and substantially beyond the bearings 19—19 and plates 15—15 and each end portion, also as seen in FIG. 2, has two paired spirally wound springs 24 mounted in spaced, side by side relationship thereon. The pairs of spiral springs 24, as applied to opposite ends of the shaft 18, are each, as illustrated in FIG. 3, enclosed in a cylindrical housing 25 that is rigidly supported from the corresponding frame plate 15. Each coiled spring 24 is made up of a flat spirally wound strip of spring metal that is formed at its inner end with a backturned hook-like portion 25x that is holdingly secured to the shaft by engaging said hook portion in a longitudinal slot 28, see FIG. 7, diametrically formed in that end portion of the shaft 18 which the spring surrounds. At their outer ends, the spring forming strips terminate in loops 25B through which tie bolts 29, that extend between the side plates 15 and outer end walls 25' of the corresponding spring enclosing housings 25, are extended. Thus, it will be understood that with clockwise turning of the shaft 18 as viewed in FIG. 3, incident to the winding in of the load lifting cable C as will presently be explained, the springs 24 are caused to be wound up, thus to store therein the driving forces that later are applied to shaft 18 for pulling the necessary slack in the cable C, for making a connection at its outer end with the load that is to be picked up.

Revolvably mounted on shaft 18 between the laterally spaced plates 15—15 is a sheave wheel 30 over which the load lifting cable C leads in passing outwardly from the cable winding drum D. This sheave wheel 30 has an encircling cable seating and guiding groove or channel 31 as seen in FIGS. 2 and 4, which preferably is formed in an annular, hard rubber or fiber tire 32 incorporated in the sheave to provide a non-slipping connection between the sheave wheel 30 and the cable, the cable being pressed against and held properly seated in the groove 31 as it is paid out, by pressure of a small diameter sheave wheel 34, best shown in FIG. 4, that is adjustably mounted between the plates 15—15, in the plane of sheave 30. The pressure of this latter sheave wheel 34 is established by means of an adjusting bolt 35 that is threaded through a cross bar 36 that is fixed in the frame structure between the laterally spaced plates 15—15, to move and press the pivoted mounting frame 33 for the sheave 34 toward the wheel 30.

The larger sheave wheel 30 has a cylindrical mounting hub 40 extending axially therethrough and on which it is rotatably mounted by needle bearings 41, but this sheave is normally held against relative rotation on the hub 40 by the pressure of spring loaded pressure plates 42 of annular form that surrounds the hub to bear in braking contact with friction discs 43 that are fixed on opposite faces of the sheave wheel 30. Clutch loading springs 44 are disposed between one of the plates 42 and a retaining ring 45 that is threaded onto the corresponding end of the hub 40 and is adjustable thereon for increasing or decreasing the clutch spring pressure. The purpose of this spring clutch is to provide a normal driving connection between sheave 30 and the hub 40 that will slip when the springs 24 have been fully wound up by the pulling in of the load lifting cable C over sheave 30.

It is further to be observed that the hub 40 that mounts the sheave wheel 30, is rotatably mounted on shaft 18 by suitable anti-friction bearings 40'—40' applied about the shaft 18 and seated within the opposite end portions of the sheave hub. Also, it is a feature of this particular arrangement of parts as seen in FIG. 2, that a one-way overriding clutch 48 is mounted on shaft 18, between the hub supporting bearings 40'—40' that operates automatically to effect a driving connection between hub 40 and shaft 18 with the turning of the sheave wheel 30 as effected by the in-winding of cable C thereover onto the drum D, as for lifting a log load. Thus, while the shaft 18 is freely axially revolvable in both directions in the main frame on bearings 19—19, the sheave wheel will normally be locked relative to shaft 18 by bearing clutch 48 when the cable C is being wound in on its drum D.

Assuming that the load lifting cable C of the system of FIG. 1A has been payed out from its winding drum D, passing over sheave 30 while firmly held seated in its groove 31, and that the butt hook has been lowered and a lifting connection made therewith, it will be understood that with the subsequent winding in of the cable C by the drum D, for load lifting and conveyance, the sheave wheel 30 will be rotated by cable C in such direction, as to cause the over-riding clutch 48 to lock with and turn shaft 18 in such direction as to cause the winding up of the four coiled springs 24. After these springs have been fully wound, further turning of the sheave 30 results merely in slippage between the clutch discs 42 and 43 under the adjusted pressure of springs 44, thus to protect the springs against overwinding damage.

Assuming that the system of FIG. 1A is being employed and that the carriage has been positioned and secured against travel on the sky-line 11, and that the cable C has been payed out from drum D and the butt hook at its outer end attached to a load, it will be understood that with the winding in of cable C on drum D, the frictional contact of this cable with the groove 31 of the sheave 30 will effect rotation of the sheave to drive its hub 40 which is locked, at that time, by overriding clutch 48 to shaft 18, and shaft 18 will be rotated in proper direction for winding up the springs 24. When these springs have become fully wound, further turning of sheave 30 by the inwinding of cable C, after the spring 24 have become fully wound will result merely in slippage of the clutch discs 42 and 43 under the adjustable pressure of springs 44 to avoid damage thereto due to any overwinding.

In the event that the system shown in FIG. 1 is being employed and that the slack puller S has been applied to a carriage 10 like that disclosed in the previously mentioned U.S. Patent No. 2,790,561, issued to Wyssen, in the manner as indicated in FIG. 1C, the operation would be as follows:

First, it is to be explained that this particular carriage has a sheave wheel 10A mounted in its lower structure, over which the cable C, after being threaded over sheave wheel 30 of the slack puller, drops to pick up a load; the cable C being equipped at its outer end with a butt hook H. The particular carriage 10 used is, in this instance, equipped with a cable clamp that can be automatically set to hold the carriage against travel on the skyline when it has reached a load pick up position. Also, it has a releasable latch that normally holds the butt hook or hook up against the carriage as seen in FIG. 1C until the carriage is clamped against travel on the skyline.

Assuming then that the carriage 10 not loaded as equipped with the slack puller S of FIG. 1 is being lowered along the skyline as to the position of FIG. 1A, the cable C unloaded will develop more or less sag as has been indicated in that view by dash line Cx. The weight of this sagging portion will ordinarily hold the butt hook high and out of reach of ground workers. In such a situation, it is obvious that slack pulling is necessary in order to lower the butt hook for making a load connection with it. This is accomplished by releasing the brake of drum D to permit the unwinding of cable C from the drum while the carriage is still held against travel down the skyline. With the release of the drum D, the wound up springs 24 will operate to drive shaft 18 in such direction as to drive the sheave 30 to pull out the slack in cable C and feed it over the sheave 10a to effect the lowering of the butt hook H for the attachment thereto of the load to be transported.

If a load has been lowered to the ground by cable C and is detached from the butt hook, the weight of the cable that causes it to sag, then causes the butt hook to be drawn up to or toward the carriage. Sometimes, the engagement of butt hook and carriage is quite violent and causes damage, but in the use of the present device, this upward drawing of butt hook by the cable is so retarded by the incident winding up of the springs 24 that the danger of damage to carriage or slack puller is avoided.

In FIG. 5, we have illustrated an alternative manner of mounting the springs, which is described as follows: Shaft 18 is mounted in the frame structure as previously described and its opposite end portions extend beyond its supporting bearings into the housings 25a as illustrated. Each end portion of the shaft 18 mounts a pair of coiled springs 24 thereon. However in this instance, the inner end of each spring is fixed to a cylindrical hub 50 that surrounds the shaft 18 and is supported thereon by a one-way roller bearing clutch 51 that has its inner raceway keyed to shaft 18. The outer end of each spring is anchored to a tie bolt 28 that is fixed in housing 25 as previously described and as shown in FIG. 2. Thus, with the lifting and inhauling of a load, shaft 18 will be driven by sheave 30 and the springs 24 will thus be wound up. When the cable winding drum D is allowed to pay out cable C the springs 24 then will drive the shaft 18 and sheave 30 to pay out the slack in cable C in the same manner previously described.

In FIG. 6 we have illustrated a multiple spring arrangement that is, in effect, the elongation or extension of a single spring. In this arrangement of parts the mounting of shaft 18 remains as described in connection with FIG. 2 and the inside coiled spring 24 is mounted on a hub 58 rotatable on a one-way clutch bearing 60 with its inner raceway 60' keyed to shaft 18 as at 62. The outer end of the spring is attached to a housing 65 that is rotatable about shaft 18.

The outside spring 24 is fixed at its inner end to a hub 66 that is rotatable about shaft 18 and has its outer end attached to a tie rod 28 mounted in the enclosing housing 25. The hub 66 is fixed to the outside wall 65x of the housing 65 as at 67. Thus, with the driving of shaft 18 by the rotation of sheave 30, by the indrawing of cable C thereover, the one way clutch bearing 60 will drive the spring mounting hub 58 to wind up spring 24 that is attached thereto while the spring 24 transmits power to the outside wall 65x of housing 65 to drive the hub 66 that mounts the outside spring coil 24. Thus, the springs are progressively wound up and they are caused to operate, as a single continuous spring in dispensing the slack pulling power to shaft 18.

While we have described the slack puller as applied to a skyline carriage, it is to be understood that it is likewise applicable to log loaders of the kind shown in FIG. 1B without change in its relationship of parts or its mode of operation, or to other types of load moving machines. Furthermore, the number of springs 24 used for powering the spring winding shaft 18 may be any desirable or suitable number on each end or one end of shaft 18 and the manner of mounting the springs may be as in FIGS. 2, 5, or 6.

Having thus described our invention, what we claim as new is:

1. A slack pulling device for use with a load lifting cable; said device including means mounting a freely rotatable shaft, a sheave wheel rotatably mounted on said shaft, with said load lifting cable running thereover, a one-way clutch associated with said sheave and shaft operable to effect a driving connection between them incident to that driving of said sheave that is effected by the inwinding of said load lifting cable, in its running thereover, and at least one powering spring having an operative connection with said shaft whereby tension therein is increased by the driving of the shaft by the sheave wheel, and through which connection tension of the spring is expended to drive said shaft and sheave wheel to draw slack from the load lifting cable.

2. The slack pulling device as recited in claim 1 wherein said sheave wheel has a tub mounted for rotation on said freely rotatable shaft and in which hub said one-way clutch is contained for driving said shaft; and wherein said sheave wheel is mounted for rotation on said hub and an adjustably tensioned clutch establishes the extent of shaft turning force that may be exerted by the sheave wheel through said one-way clutch.

3. A slack pulling device for a load lifting cable that is extended to said device from a cable winding drum or the like; said slack pulling device comprising a mounting frame structure, a shaft freely rotatably mounted in said frame structure, a sheave wheel rotatably mounted on the shaft with said load lifting cable running thereover, a one-way clutch associated with the sheave wheel and shaft and operable to effect a driving connection between them to drive the shaft with the inwinding of the load lifting cable on said drum, and at least one spirally wound spring applied about said shaft with its outer end fixed to said mounting frame structure and its inner end secured to said shaft for winding thereby incident to that turning of the shaft that is incident to the inwinding of the cable over said sheave wheel; said spring being operable with the relaxing of load lifting pull on the cable as extended from the winding drum, to drive the shaft and sheave wheel for the pulling of slack from the load lifting cable.

4. The combination recited in claim 3 wherein the sheave wheel has a tubular mounting hub on which the wheel is rotatably mounted and in which said one-way clutch is contained, and wherein an adjustably tensioned friction-disc clutch is applied about the hub to establish the limit of the driving force that may be applied by the sheave wheel to the hub for rotation of the spring winding shaft.

5. A slack pulling device for use with a load lifting cable; said device comprising a frame structure, a horizontal cross-shaft freely mounted for rotation in said frame structure, a sheave wheel rotatably mounted on said shaft medially of its ends, with said cable running thereover for load lifting and lowering, a one-way clutch associated with said sheave wheel and shaft in such manner as to effect a driving connection between them incident to the driving of the sheave wheel as effected by the inwinding of the cable in lifting a load, said shaft having a plurality of spirally wound springs applied about each of its opposite end portions, each spring having its outer end fixed to the frame structure and its inner end secured for its winding by said shaft and being so mounted that the turning of the shaft which is incident to the inwinding of the cable will build tension therein and all springs will act in unison in the dissipation of tension for driving the shaft for slack pulling in the cable.

6. The combination recited in claim 5 wherein the plurality of springs as applied to opposite ends of said shaft are joined together end to end and the succession of joined springs is fixed at one end to the frame structure and at its other end to the shaft for the reception and distribution of winding tension to all springs in the succession, and for the simultaneous dissipation of shaft driving forces therefrom for slack pulling.

7. A slack pulling device according to claim 5 wherein said frame structure mounts a sheave wheel that is supported by a pivotally mounted lever arm for pressing engagement against the load lifting cable, to adjust its frictional driving pressure in running over said sheave wheel and means for adjusting said pivoted lever arm to control the pressure of said sheave against the cable.

References Cited in the file of this patent
UNITED STATES PATENTS

| | | |
|---|---|---|
| 1,530,244 | Dickinson | Mar. 17, 1925 |
| 2,359,073 | Allard | Sept. 26, 1944 |
| 2,562,028 | Foss | July 24, 1951 |
| 2,947,516 | Jackson | Aug. 2, 1960 |